(12) United States Patent
Gravely et al.

(10) Patent No.: US 11,406,093 B2
(45) Date of Patent: Aug. 9, 2022

(54) EXTENSIBLE POLE COUPLING ASSEMBLY

(71) Applicant: GEM Products, Inc., Jacksonville, FL (US)

(72) Inventors: William Ashford Gravely, Washington, NC (US); Jason Sarnowski, Jacksonville, FL (US); Matthew Stewart Onorato, Jacksonville, FL (US)

(73) Assignee: GEM Products, Inc., Jacksonville, FL (US)

( * ) Notice: Subject to any disclaimer, the term of this patent is extended or adjusted under 35 U.S.C. 154(b) by 431 days.

(21) Appl. No.: 16/542,711

(22) Filed: Aug. 16, 2019

(65) Prior Publication Data

US 2021/0045372 A1 Feb. 18, 2021

(51) Int. Cl.
| A01K 87/02 | (2006.01) |
| F16B 7/04  | (2006.01) |
| A01K 97/10 | (2006.01) |
| A01K 87/04 | (2006.01) |
| A01K 87/00 | (2006.01) |

(52) U.S. Cl.
CPC ............ *A01K 87/02* (2013.01); *A01K 87/002* (2013.01); *A01K 87/005* (2013.01); *A01K 87/04* (2013.01); *A01K 97/10* (2013.01); *F16B 7/042* (2013.01)

(58) Field of Classification Search
CPC ........ A01K 87/00; A01K 87/02; A01K 87/06; A01K 87/08; A01K 87/04; A01K 87/002; A01K 87/005; F16B 7/02; F16B 7/0406; F16B 7/0413; B63B 35/14; F16L 27/12

USPC ........ 43/18.1 HR, 8.1 CT, 27.4, 27.2, 43.13, 43/43.12, 24, 18.1 CT; 285/298, 302; 138/120

See application file for complete search history.

(56) References Cited

U.S. PATENT DOCUMENTS

| 32,100 | A | * | 4/1861 | Wyckoff | F16B 7/0413 |
| | | | | | 285/397 |
| 69,506 | A | * | 10/1867 | Stine | F16L 21/002 |
| | | | | | 285/397 |
| 95,921 | A | * | 10/1869 | Mears | F16B 7/0413 |
| | | | | | 285/397 |
| 113,530 | A | * | 4/1871 | King | F16B 7/0413 |
| | | | | | 285/397 |

(Continued)

FOREIGN PATENT DOCUMENTS

| GB | 2369026 | A | * | 5/2002 | ............. A01K 87/08 |
| JP | 04248945 | A | * | 9/1992 | ............. A01K 87/00 |

(Continued)

OTHER PUBLICATIONS https://www.marshtackycarbon.com/shop/cf-riggers/x/ (Oct. 23, 2017).

(Continued)

*Primary Examiner* — Darren W Ark
*Assistant Examiner* — Katelyn T Truong
(74) *Attorney, Agent, or Firm* — Seyfarth Shaw LLP (57) ABSTRACT

A coupling assembly to releasably couple two or more tubes together. The tubes can be assembled and disassembled with conventional hand tools. A line or cable can be routed through the tubes. The coupling assembly can prevent snagging of lines on the exterior of the tubes. The coupling assembly can flex with the tubes under load, and the line can be fed through the coupling assembly without snagging.

29 Claims, 6 Drawing Sheets

(56) References Cited

U.S. PATENT DOCUMENTS

| | | | | | |
|---|---|---|---|---|---|
| 118,166 | A | * | 8/1871 | Stephenson | F16B 7/0413 285/397 |
| 272,006 | A | * | 2/1883 | Webster | F16B 7/0413 403/292 |
| 372,075 | A | * | 10/1887 | Lehman | F16L 27/12 285/298 |
| 501,918 | A | * | 7/1893 | Caldwelll | F16B 7/0413 403/298 |
| 1,016,748 | A | * | 2/1912 | Howland | F16B 7/0413 403/292 |
| 1,678,350 | A | * | 7/1928 | Ott | H01R 4/60 439/797 |
| 2,601,351 | A | * | 6/1952 | Wilburn | F16B 7/0426 403/300 |
| 2,850,304 | A | * | 9/1958 | Wagner | F16B 7/0413 285/397 |
| 3,000,656 | A | * | 9/1961 | Hollaender | F16B 7/0413 403/298 |
| 3,059,589 | A | * | 10/1962 | Schreyer | F16B 7/0413 104/111 |
| 3,117,388 | A | * | 1/1964 | Clarke | A01K 87/04 43/24 |
| 3,173,713 | A | * | 3/1965 | Yasui | A01K 87/02 403/334 |
| 3,245,169 | A | * | 4/1966 | Kennel | A01K 87/02 43/18.1 CT |
| 3,310,903 | A | * | 3/1967 | Rene | A01K 87/02 43/18.5 |
| 3,389,046 | A | * | 6/1968 | Burress | A01K 87/02 428/371 |
| 3,406,993 | A | * | 10/1968 | Haynes | A01K 87/02 403/345 |
| 3,482,859 | A | * | 12/1969 | Bowlin | F16L 21/035 285/332.3 |
| 3,484,830 | A | * | 12/1969 | Wagner | F16B 7/0413 285/397 |
| 3,554,590 | A | * | 1/1971 | Tarantino | A01K 87/02 403/293 |
| 3,572,778 | A | * | 3/1971 | Cassel | F16L 25/04 285/382 |
| 3,722,130 | A | * | 3/1973 | Handl | F16G 11/08 43/44.98 |
| 3,736,009 | A | * | 5/1973 | Juhnke | F16B 7/0446 403/192 |
| 3,752,505 | A | * | 8/1973 | Stout | F16L 27/12 285/5 |
| 3,947,141 | A | * | 3/1976 | Casset | A01K 87/02 403/109.8 |
| 4,284,298 | A | * | 8/1981 | Kaufmann, Jr. | F16L 21/06 285/302 |
| 4,288,114 | A | * | 9/1981 | Hansen | F16L 37/12 285/111 |
| 4,344,719 | A | * | 8/1982 | Thom | E04F 11/1817 403/297 |
| 4,440,518 | A | * | 4/1984 | Davlantes | F16B 7/0413 403/297 |
| 4,580,788 | A | * | 4/1986 | Rabe | F16L 7/02 277/314 |
| 4,706,380 | A | * | 11/1987 | Fall | B25B 13/48 285/419 |
| 4,818,135 | A | * | 4/1989 | Desjardins | F16B 7/1472 248/413 |
| 4,886,304 | A | * | 12/1989 | Kunsman | F16L 19/065 285/104 |
| 4,958,953 | A | * | 9/1990 | Charondiere | B29C 66/63 403/295 |
| 5,090,837 | A | * | 2/1992 | Mower | F16B 7/0413 403/334 |
| 5,141,258 | A | * | 8/1992 | Stine | F16L 27/1275 285/31 |
| 5,387,048 | A | * | 2/1995 | Kuo | A45B 19/04 135/25.1 |
| 5,456,038 | A | * | 10/1995 | Park | A01K 87/005 43/18.1 R |
| 5,528,848 | A | * | 6/1996 | Myojo | A01K 87/002 43/18.1 R |
| 5,593,196 | A | * | 1/1997 | Baum | B25J 1/04 294/174 |
| 5,647,162 | A | * | 7/1997 | Akiba | A01K 87/005 43/18.1 R |
| 5,779,386 | A | * | 7/1998 | Eichhorn | A47D 13/105 403/109.3 |
| 5,974,722 | A | * | 11/1999 | Kiser | A01K 97/01 43/18.1 CT |
| 6,565,129 | B2 | * | 5/2003 | Surjaatmadja | F16L 27/0861 285/302 |
| 6,722,810 | B1 | * | 4/2004 | Tachikawa | F16D 3/06 403/362 |
| 6,854,916 | B2 | * | 2/2005 | Hsieh | F16B 7/105 403/109.1 |
| 6,902,205 | B2 | * | 6/2005 | Bouey | F16L 33/224 285/243 |
| 7,485,808 | B2 | * | 2/2009 | Guthke | F16L 3/1091 138/120 |
| 7,854,564 | B1 | * | 12/2010 | Erickson | E04H 12/32 403/379.3 |
| 7,896,398 | B2 | * | 3/2011 | Suda | B25G 1/04 285/7 |
| 10,787,836 | B2 | * | 9/2020 | Jung | E04H 15/60 |
| 10,844,626 | B2 | * | 11/2020 | Yang | E04H 15/46 |
| 2004/0016385 | A1 | * | 1/2004 | Wilcox | A01K 91/08 114/255 |
| 2005/0034353 | A1 | * | 2/2005 | Gustlin | A01K 87/04 43/24 |
| 2005/0126465 | A1 | * | 6/2005 | Wilcox | A01K 91/08 114/255 |
| 2007/0031187 | A1 | * | 2/2007 | McNeal | F16B 7/0413 403/297 |
| 2007/0206989 | A1 | * | 9/2007 | Wagner | E04F 11/1836 403/297 |
| 2007/0257488 | A1 | * | 11/2007 | Jimenez | F16L 25/065 285/404 |
| 2011/0084481 | A1 | * | 4/2011 | Peng | B63B 45/00 285/302 |
| 2012/0211978 | A1 | * | 8/2012 | Gardiner | F16B 7/0413 285/382 |
| 2013/0005538 | A1 | * | 1/2013 | Coote | A63B 21/00047 482/33 |
| 2016/0121649 | A1 | * | 5/2016 | Chang | B60B 25/02 403/282 |
| 2017/0089374 | A1 | * | 3/2017 | Onorato | B63B 35/14 |
| 2018/0014522 | A1 | * | 1/2018 | Bridgewater | A01K 97/06 |
| 2020/0018088 | A1 | * | 1/2020 | Yang | F16B 7/182 |
| 2021/0051934 | A1 | * | 2/2021 | Tsukamoto | A01K 87/02 |

FOREIGN PATENT DOCUMENTS

| | | | | | |
|---|---|---|---|---|---|
| JP | 07059491 | A | * | 3/1995 | A01K 87/00 |
| JP | 07059492 | A | * | 3/1995 | A01K 87/00 |
| JP | 07067504 | A | * | 3/1995 | A01K 87/00 |
| JP | 07099864 | A | * | 4/1995 | A01K 87/00 |
| JP | 07099865 | A | * | 4/1995 | A01K 87/00 |
| JP | 07284360 | A | * | 10/1995 | A01K 87/04 |
| JP | 10127213 | A | * | 5/1998 | A01K 87/04 |
| JP | 11318282 | A | * | 11/1999 | A01K 91/06 |
| KR | 2016125124 | A | * | 10/2016 | |
| KR | 2016125125 | A | * | 10/2016 | |
| WO | WO-2010074459 | A2 | * | 7/2010 | A01K 87/08 |

OTHER PUBLICATIONS https://www.marshtackycarbon.com/shop/cf-riggers/i/ (Jun. 12, 2019).
http://www.leetackle.com/carbonfiberpoles.html (Jul. 9, 2014).

* cited by examiner

EXTENSIBLE POLE COUPLING ASSEMBLY

TECHNICAL FIELD OF THE INVENTION

The present invention relates generally to coupling assemblies. More particularly, the present invention relates to extensible pole coupling assemblies.

BACKGROUND OF THE INVENTION

Extensible poles, such as outriggers, are popular in fishing applications. Outriggers are rigid poles that are a part of the boat's rigging and are designed to extend fishing pole bait lines beyond the "white wash" of the water surrounding the boat. This is preferable because bait traveling through clear water is more likely to successfully attract and bait a fish. Once a fish takes the bait, the line is automatically released from the outrigger and all forces are transferred directly to a fishing pole secured to the gunnel of the boat. For example, the bait line can be connected to a quick release mechanism that releases the line and transfers forces to the pole when a fish engages the bait or otherwise pulls on the line.

Outriggers typically include several interconnectable or extensible tubes connected to one another by an interconnection device, such as clamps, adhesives, rivets, fasteners or other permanent or difficult to disassemble interconnections. The interconnection device can secure the tubes together when the outrigger is arranged in the extended position to prevent the tubes from collapsing upon one another. Also, the interconnection device can be engaged when arranged in a collapsed position to prevent the tubes from extending.

This setup is convenient for the collapsibility, but has two disadvantages. The first is that the wall thicknesses of the tubes are limited by the need for the tubes to be fully nestable when collapsed. Thicker walls result in a stiffer structure. Stiffness is desirable for reducing unwanted bending motion when out at sea, where excessive motion of the outrigger could cause damage to equipment. However, the thicker the walls, the lesser the ability to interconnect a number of poles to create the desired outrigger distance. The second disadvantage is that the clamps create a snagging hazard for certain types of fishing, such as kite fishing where it is desirable that the outside of the outrigger is without obstruction. It is also aesthetically pleasing to have the outside of the outriggers be free of clamping devices.

Current outrigger models without clamps require irreversible assembly techniques to couple the joints where the tubes meet, such as adhesives and/or rivets, or construct the outriggers as a single piece without any joints. However, these solutions eliminate the possibility of being able to collapse the outriggers for storage and/or transportation.

SUMMARY OF THE INVENTION

The present invention broadly relates to an extensible pole, such as an outrigger, coupling assembly capable of securing two or more tubes together. The tubes can be assembled and disassembled with conventional hand tools. A line or cable, such as a fishing line, can be routed through the tubes. The coupling assembly can reduce snagging of lines on the exterior of the tubes. The coupling assembly can flex with the tubes under load, and a line can be fed through the coupling assembly without snagging.

In an embodiment, the present invention broadly includes a coupling assembly with first and second bodies. The first body includes a frame, a boss, and an aperture adapted to allow a fastener to pass through the boss. The second body is adapted to receive the fastener to couple to the first body and includes an adapted to receive the frame. The first and second bodies are adapted to couple first and second tubes disposed in a gap formed between the first and second bodies.

In another embodiment, the present invention broadly includes an outrigger assembly including first and second nestable tubes respectively having first and second diameters, wherein the second diameter is less than the first diameter, and a coupling assembly. The coupling assembly includes first and second bodies. The first body includes a frame, a boss, and an aperture which is adapted to allow a fastener to pass through the boss, and is adapted to be disposed outside of the first nestable tube. The second body is adapted to couple to the first body by receiving the fastener and is adapted to be disposed inside the second nestable tube. The first and second bodies are adapted to couple the first and second nestable tubes together.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly relates to an extensible pole, such as an outrigger, coupling assembly capable of coupling two or more tubes together. The tubes can be assembled and disassembled with conventional hand tools. A line or cable can be routed through the tubes. The coupling assembly can prevent snagging of lines on the exterior of the tubes. The coupling assembly can flex with the tubes under load, and a line can be fed through the coupling assembly without snagging. It will be appreciated that while the present invention is disclosed in use with an outrigger for fishing, the present invention is not to be limited to such use, and can be used with any type of extensible or interconnectable poles assemblies. Moreover, the present invention is described as including two nestable or interconnectable tubes, but the present invention can be used with any number of tubes.

Referring to FIGS. 1-10, an outrigger assembly 100 can include a first tube 102, a second tube 104, an outer body 106, and an inner body 108. The outer and inner bodies 106, 108 can also be referred to collectively as a coupling assembly. The outrigger assembly 100 can include a number of coupling assemblies to securely and releasably couple corresponding interconnectable tubes together.

In an embodiment, the first and second tubes 102, 104 can be nestable tubes, or can be otherwise interconnectable. As illustrated, the second tube 104 has an inner diameter larger than the outer diameter of the first tube 102, and is adapted to receive the first tube 102. Each of the first and second tubes 102, 104 includes an opening 110 and an aperture 112, which will be discussed below. As illustrated, the first and second tubes 102, 104 can have two or more apertures 112. The tubes can be constructed of carbon-fiber, aluminum, steel, or any other suitable material.

The outer body 106 (also referred to as the first body) is adapted to be received on the outer surface of the second tube 104. The outer body 106 can have a curved surface 114 that correspondingly mates with the curvature of the second tube 104 to reduce the possibility of snagging events or otherwise creating undesirable edges.

The outer body 106 can include a boss 116 adapted to be received by the aperture 112 of the first and second tubes 102, 104. As illustrated, the outer body 106 can include two or more bosses 116. Each boss 116 can be adapted to receive a fastener 118, which will be discussed in more detail below. Each boss 116 can provide galvanic and abrasive isolation between the fastener 118 and the first and second tubes 102, 104. This isolation is advantageous when the material of the fastener 118 and the material of the first and second tubes 102, 104 have a galvanic potential, such as steel and carbon fiber, where direct contact between the two materials could cause the fastener 118 to become an anode and corrode, especially in a salt water environment. This isolation is also advantageous because it protects the edge of the aperture 112 from abrasion by the fastener 118. The boss 116 can also provide protection against over-tightening of fastener 118, which could cause degradation or cracking of the first and second tubes 102, 104, and can resist rotation of the first and second tubes 102, 104 relative to one another.

The outer body 106 can include an aperture 120. As illustrated, the aperture 120 can be a countersunk clearance hole adapted to allow a fastener to pass through the boss 116 and the curved surface 114. As illustrated, the outer body 106 can include two or more apertures 120.

Figure 7:
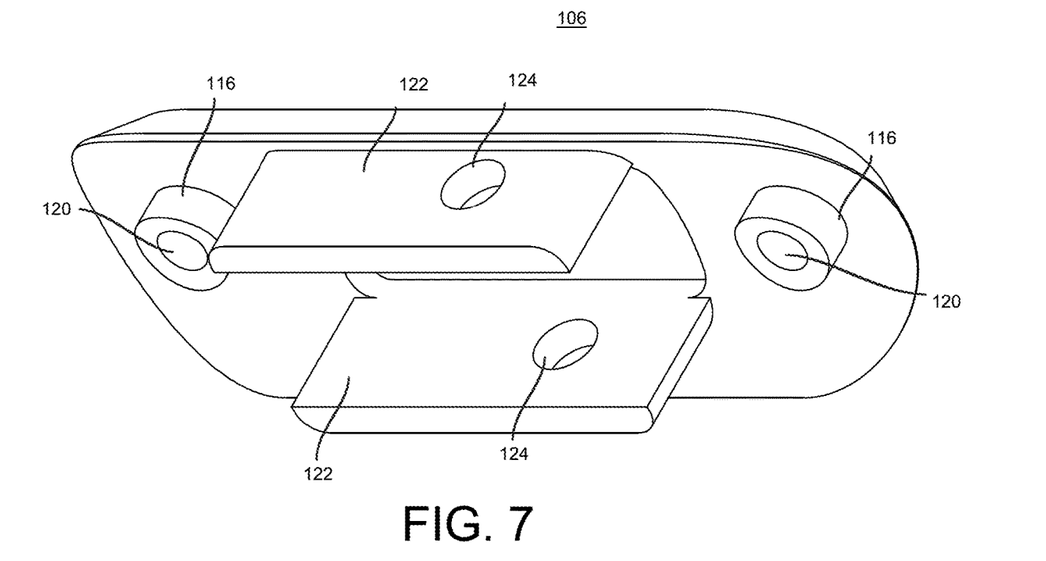
FIG. 7 is a perspective bottom view of an outer body of the outrigger coupling assembly of FIG. 1.

The outer body 106 can include a frame 122 that can provide structural support to the outrigger assembly 100. The frame 122 is adapted to fit in the opening 110 of the first and second tubes 102, 104, thereby resisting rotation of the tubes relative to one another. As illustrated, the outer body 106 can include two frames 122 on opposing sides of the opening 110. Referring to FIG. 7, the frame 122 can include an aperture 124.

Figure 8:
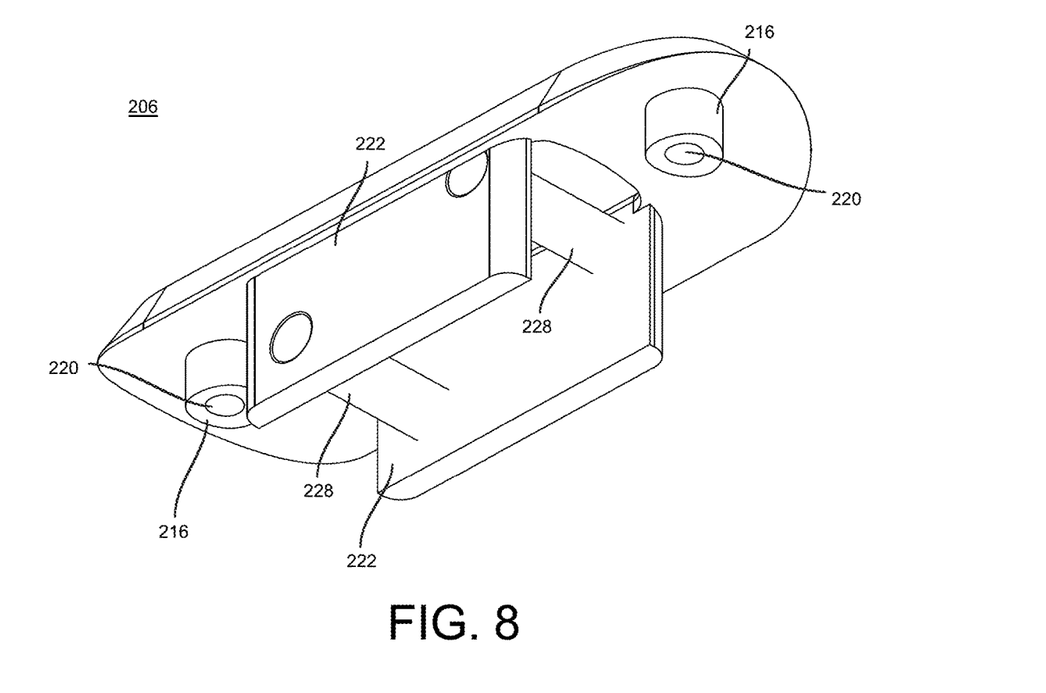
FIG. 8 is a perspective bottom view of an outer body of an outrigger coupling assembly according to another embodiment of the present invention.

A line guide can be coupled to the outer body 106 that can include a roller 126 coupled to the frame 122 using the aperture 124. In another embodiment, the outer body 206 can include a frame 222 with a pin 228 instead of, or in addition to, the roller 126 and aperture 124. Referring to FIG. 8, the frame 222 can include two pins 228 for guiding multiple lines. The outer body 206 can have a curved surface (not shown) and a boss 216 (which are substantially similar to the curved surface 114 and the boss 116 described above).

Figure 4:
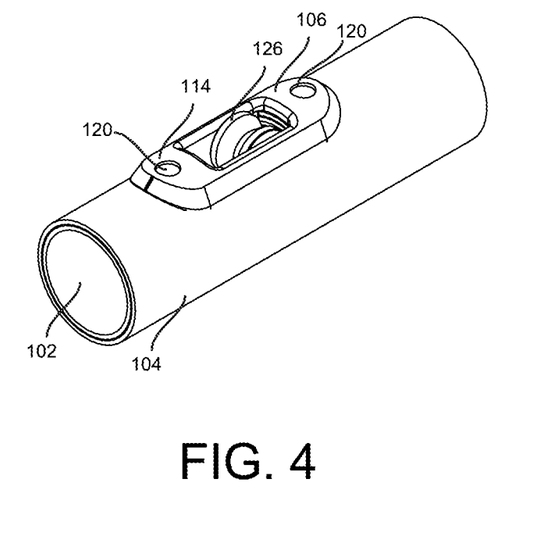
FIG. 4 is a perspective, assembled view of the outrigger coupling assembly of FIG. 1.
Figure 5:
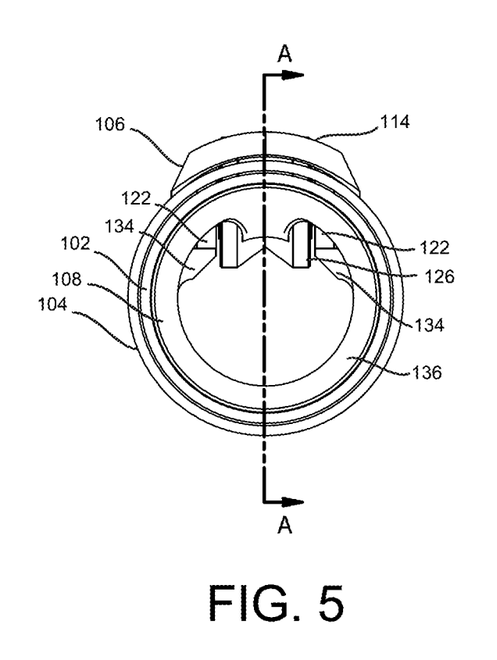
FIG. 5 is a side, assembled view of the coupling assembly of FIG. 1.
Figure 6:
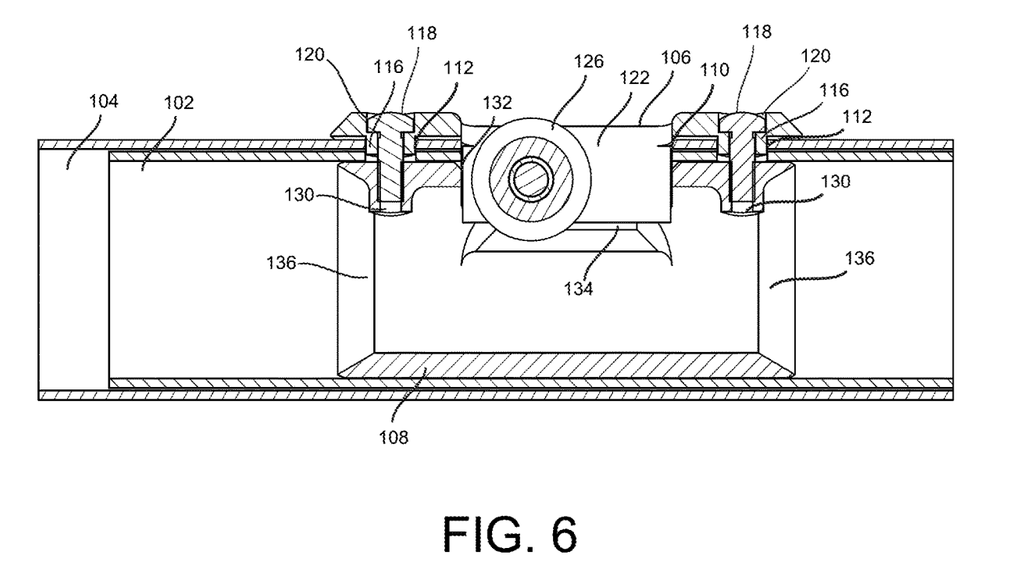
FIG. 6 is a sectional view of FIG. 5, taken along line A-A of FIG. 5.

The inner body 108 (also referred to as the second body) is adapted to be received by the first tube 102. The inner body can be constructed such that it flexes with the outrigger assembly 100 under load. The inner body 108 can be adapted to retain the fastener 118 in an aperture 130, thereby assembling the outer body 106 and the first and second tubes 102, 104 (as shown in FIGS. 4-6). The aperture 130 can be adapted to be used with a threaded fastener, such as a screw or a bolt. For example, the aperture 130 may be a pre-threaded hole or a pilot hole for a self-threading screw.

The inner body 108 can be an annulus and can include an opening 132 adapted to receive the frame 122 of the outer body 106. A protrusion 134 can be arranged in the interior of the inner body 108. As illustrated, the inner body 106 can have two or more protrusions 134. The protrusion 134 can be adapted to abut the frame 122 when the outer body 106 is inserted into the opening 132, thereby setting a gap between the inner and outer bodies 108, 106 for the nested first and second tubes 102, 104. The gap, which is determined by the height of the boss 116 and/or the frame 122, can be set to compress the nestable first and second tubes 102, 104 such that the outrigger assembly 100 is loaded in bending as it would be when fishing (or other load). Additionally, or alternatively, the frame 122 can be loaded in-column to prevent buckling of the outrigger assembly 100 where openings, as described above, are present.

Figure 1:
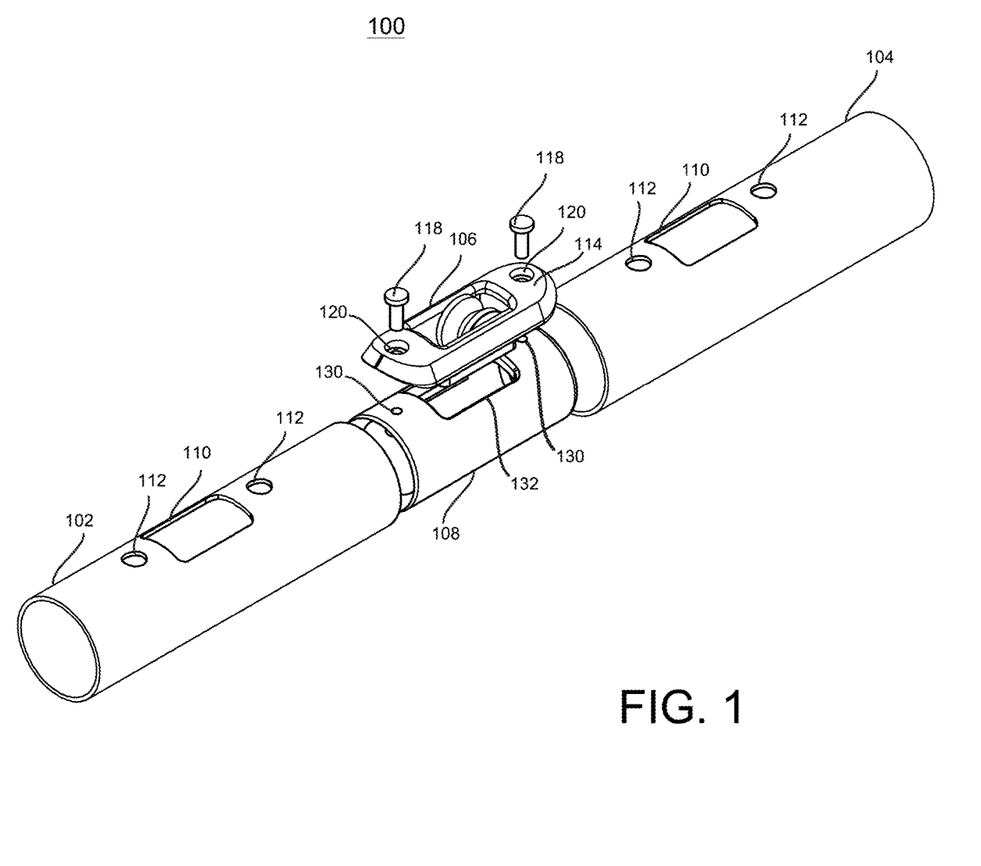
FIG. 1 is a perspective, partially disassembled view of an outrigger coupling assembly according to an embodiment of the present invention.
Figure 2:
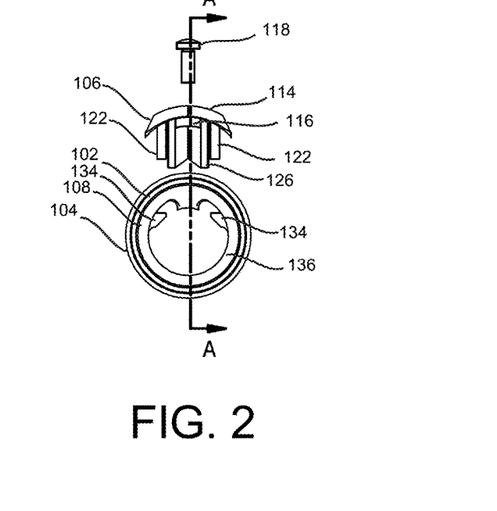
FIG. 2 is a side, exploded plan view of the outrigger coupling assembly of FIG. 1.
Figure 3:
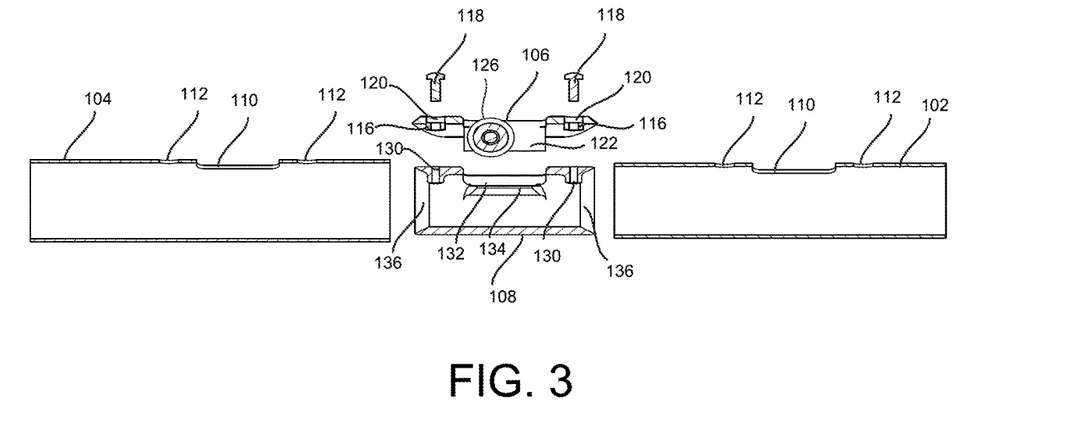
FIG. 3 is a sectional view of FIG. 2, taken along line A-A of FIG. 2.

The inner body 108 can have open ends (as shown in FIG. 1) to allow a line to pass therethrough. The open end(s) can have a chamfer 136 to allow the line to be easily inserted into the inner body 108 and prevents snagging or abrasion of the line.

Figure 9:
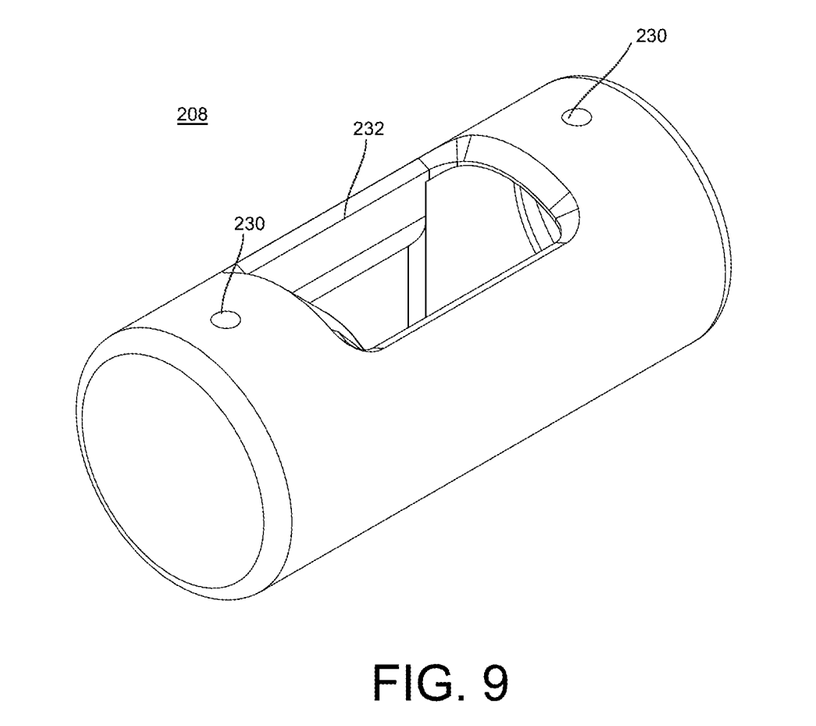
FIG. 9 is a perspective view of an inner body of an outrigger coupling assembly according to an embodiment of the present invention.
Figure 10:
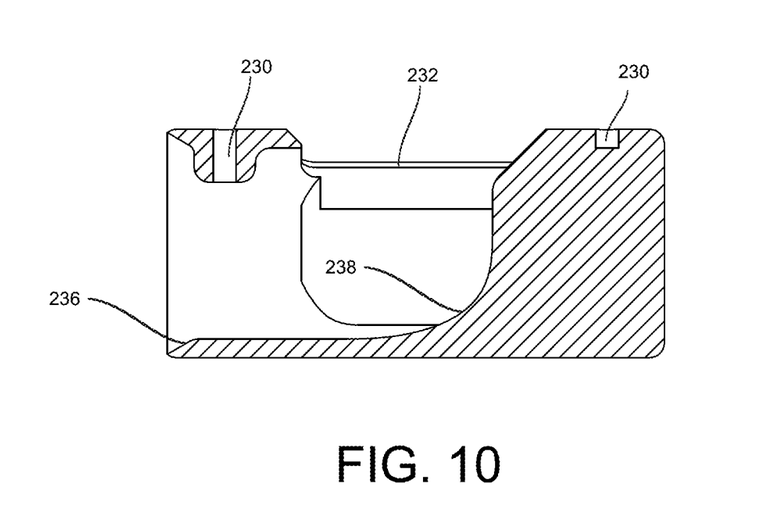
FIG. 10 is a sectional view of FIG. 9.

In another embodiment, an inner body 208 has open and captured ends (as shown in FIGS. 9 and 10) and can include a curved inner surface 238 that can assist in guiding a line that is inserted into the open end out of the opening 232. The opening 232 can be adapted to receive the outer body 106/206. The inner body 208 can have a protrusion (not shown), an aperture 230, and a chamfer 236 on the open end (which are substantially similar to the protrusion 134, the aperture 130, and the chamfer 136 described above).

The coupling assembly, which includes the outer body 106/206 and the inner body 108/208 can compress the nested first and second tubes 102, 104 and secure the same in position when fastener(s) 118, such as first and second fasteners, couples the outer body 106/206 and the inner body 108/208 by being respectively inserted through aperture(s) 120/220 of the outer body 106/206 and aperture(s) 112 of the nested first and second tubes 102, 104 and coupled to the aperture(s) 130/230 of the inner body 108/208. The fastener(s) 118 can close the gap between the outer and inner bodies 106/206, 108/208, when further respectively inserted into aperture(s) 130/230 of the inner body 108/208, thereby further compressing the nested first and second tubes 102, 104.

Disassembly of the coupling assembly may be performed by reversing the order of the coupling of the coupling assembly described above. For example, the fastener(s) 118 are decoupled from the respective aperture(s) 130/230 of the inner body 108/208 and removed from the respective aperture(s) 120/220 of the outer body 106/206 and the aperture(s) 112 of the nested first and second tubes 102, 104. The first tube 102 can then be removed from the second tube 104.

Therefore, disassembly of the coupling assembly for transportation and/or storage is simplified, since adhesives and/or rivets are not used, requiring only the removal of the fastener(s) 118 and outer body 106/206 to de-couple or de-nest tubes 102, 104. Significantly, the coupling assembly does not restrict the length of the tubes 102, 104 in any way and different thicknesses and diameters of the tubes 102, 104 can be used with this same coupling assembly simply by altering the height of boss 116 and frame 122 and the diameter of the inner body 108/208. For example, the tube length may be chosen such that the disassembled outrigger assembly 100 can be transported in a standard size shipping box. In addition, maintenance and/or repair of the line guide is simplified due to the ease of disassembly and access. Ease of rigging the line through the coupling assembly is increased due to the size of the open end(s) of the inner body 108/208 and the ability to disassemble of the coupling assembly.

As discussed herein, the present invention can be utilized with an outrigger, for example, coupling a first nestable tube to a second nestable tube. However, any two work pieces can be coupled together with the present invention, and not necessarily two nestable tubes or two other outrigger portions. Further, the present invention contemplates that the outrigger coupling assembly 100 can receive and pass through a line. Any type of line, such as a fishing line, filament, string, rope, or other object, can be received without departing from the spirit and scope of the present invention.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A coupling assembly for releasably coupling first and second tubes, comprising:
    a first body including a frame, a boss, and an aperture adapted to allow a fastener to pass through the boss; and
    a second body adapted to be disposed inside the first and second tubes and receive the fastener to releasably couple the second body to the first body, and the second body includes an opening adapted to receive the frame, wherein the first and second bodies are adapted to releasably couple the first and second tubes together when the second body is disposed inside the first and second tubes and the first and second tubes are disposed in a gap formed between the first and second bodies.

2. The coupling assembly of claim 1, wherein when the frame is disposed in the opening and the first and second tubes are disposed in the gap, the frame resists rotation of the first tube relative to the second tube.

3. The coupling assembly of claim 1, wherein the frame is adapted to abut a protrusion disposed in the second body, and wherein the gap is determined by a height of the frame.

4. The coupling assembly of claim 1, wherein the fastener is isolated from contacting the first and second tubes by the boss.

5. The coupling assembly of claim 1, wherein the first body includes a line guide.

6. The coupling assembly of claim 5, wherein the line guide is a roller.

7. The coupling assembly of claim 5, wherein the line guide is a pin.

8. The coupling assembly of claim 1, wherein the first body is disposed outside of the first and second tubes.

9. The coupling assembly of claim 1, wherein the first tube is a nestable tube with a first diameter, and wherein the second tube is a nestable tube with a second diameter that is less than the first diameter and is adapted to be inserted into the first tube.

10. A coupling assembly for releasably coupling first and second tubes, comprising:
    a first body including a frame, a line guide, a boss, and an aperture adapted to allow a fastener to pass through the boss; and
    a second body adapted to receive the fastener to couple the second body to the first body, and the second body includes an opening adapted to receive the frame, wherein the first and second bodies are adapted to releasably couple the first and second tubes together when the first and second tubes are disposed in a gap formed between the first and second bodies.

11. The coupling assembly of claim 10, wherein when the frame is disposed in the opening and the first and second tubes are disposed in the gap, the frame resists rotation of the first tube relative to the second tube.

12. The coupling assembly of claim 10, wherein the frame is adapted to abut a protrusion disposed in the second body, and wherein the gap is determined by a height of the frame.

13. The coupling assembly of claim 10, wherein the line guide is a roller.

14. The coupling assembly of claim 10, wherein the line guide is a pin.

15. An outrigger assembly comprising:
    first and second nestable tubes respectively having first and second diameters, wherein the second diameter is less than the first diameter; and
    a coupling assembly including:
        a first body having a frame, a boss, and an aperture adapted to allow a fastener to pass through the boss, and the first body is adapted to be disposed outside proximate to an outer surface of the first nestable tube; and
        a second body adapted to be disposed inside the second nestable tube and couple to the first body by receiving the fastener, and the second body includes an opening adapted to receive the frame, wherein the first and second bodies are adapted to releasably couple the first and second nestable tubes to each other.

16. The outrigger assembly of claim 15, wherein when the first and second nestable tubes are releasably coupled to each other, the frame resists rotation of the first and second nestable tubes relative to each other.

17. The outrigger assembly of claim 15, wherein the first and second nestable tubes are adapted to be disposed in a gap formed between the first and second bodies.

18. The outrigger assembly of claim 17, wherein the frame is adapted to abut a protrusion disposed in the second body, and wherein the gap is determined by a height of the frame.

19. The outrigger assembly of claim 15, wherein the fastener is isolated from contacting the first and second nestable tubes by the boss.

20. The outrigger assembly of claim 15, wherein the first body further includes a line guide.

21. The outrigger assembly of claim 20, wherein the line guide is a roller.

22. The outrigger assembly of claim 20, wherein the line guide is a pin.

23. The outrigger assembly of claim 15, wherein the first and second nestable tubes are loaded in bending when coupled together by the first and second bodies.

24. An outrigger assembly comprising:
first and second nestable tubes respectively having first and second diameters, wherein the second diameter is less than the first diameter; and
a coupling assembly including:
a first body having a frame, a line guide, a boss, and an aperture adapted to allow a fastener to pass through the boss, and the first body is adapted to be disposed proximate to an outer surface of the first nestable tube; and
a second body adapted to be disposed inside the second nestable tube and couple to the first body by receiving the fastener,
wherein the first and second bodies are adapted to releasably couple the first and second nestable tubes to each other.

25. The outrigger assembly of claim 24, wherein when the first and second nestable tubes are releasably coupled to each other, the frame resists rotation of the first and second nestable tubes relative to each other.

26. The outrigger assembly of claim 24, wherein the first and second nestable tubes are adapted to be disposed in a gap formed between the first and second bodies.

27. The outrigger assembly of claim 26, wherein the frame is adapted to abut a protrusion disposed in the second body, and wherein the gap is determined by a height of the frame.

28. The outrigger assembly of claim 24, wherein the line guide is a roller.

29. The outrigger assembly of claim 24, wherein the line guide is a pin.

* * * * *